Oct. 19, 1965  E. J. M. ROSENTHAL ETAL  3,212,925
FLAME RESISTANT PRESSURE-SENSITIVE ADHESIVE MATERIALS
Filed Aug. 1, 1962
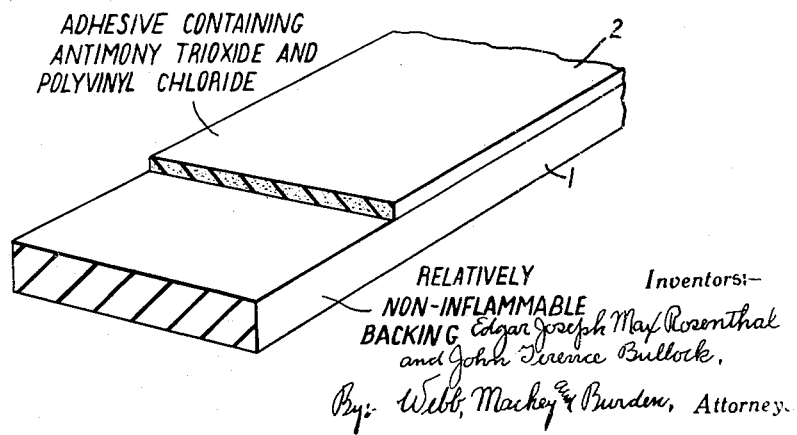

FLAME RESISTANT PRESSURE-SENSITIVE ADHESIVE MATERIALS

Edgar Joseph Max Rosenthal, Romiley, near Stockport, and John Terence Bullock, Urmston, Manchester, England, assignors to Rotunda Limited, Denton, Manchester, England, a British company
Filed Aug. 1, 1962, Ser. No. 214,096
Claims priority, application Great Britain, Aug. 4, 1961, 28,496/61
6 Claims. (Cl. 117—122)

This invention relates to pressure-sensitive adhesive materials comprising a backing in sheet or tape form carrying on its surface a pressure-sensitive adhesive of the kind often referred to as "aggressively" adhesive; since such materials are widely used in tape form they will for convenience be referred to herein as "pressure-sensitive adhesive tapes."

The principal object of the invention is to increase the flame resistance of pressure-sensitive adhesive tapes. This can and has been done to some extent by selecting a relatively non-inflammable backing material, for example plasticised or unplasticised polyvinyl chloride, and increasing its flame resistance by the addition of flame retardants but it is difficult to increase the flame resistance of the adhesive, which is normally a highly inflammable material based on elastomers, resins, fillers and softeners. The difficulties reside in the selection of flame retardant additives that will not seriously detract when employed in proportions which are effective from the adhesive, cohesive and other desirable properties of the mass and in devising a method of incorporating the additives that does not result in a substantial deterioration of these properties.

The present invention is based on our discovery of a formulation for a relatively non-inflammable pressure-sensntive adhesive, containing flame retardant additives, and of a method of incorporating these additives into the adhesive that does not seriously detract from its properties.

In accordance with the invention, a pressure-sensitive tape comprises a relatively non-inflammable backing carrying a relatively non-inflammable adhesive comprising one or more elastomers, fillers, softeners and resins, together with (a) antimony trioxide and (b) polyvinyl chloride or one or more copolymers of vinyl chloride or a mixture of polyvinyl chloride and one or more copolymers of vinyl chloride, the chlorine content of the copolymer or copolymers if used alone or of the mixture of polymer and one or more copolymers being not less than 30% by weight on the weight of the copolymer or copolymers or of the mixture, as the case may be, these polymeric materials being in finely divided form and preferably but not necessarily being in the form known as "paste-making polymer."

The backing is preferably a material based on a polymer or copolymer of vinyl chloride. It may be plasticised and may contain a flame retardant additive or additives, but other relatively non-inflammable backing materials may be used. The adhesive may also contain other ingredients, for example preservatives and colouring materials.

A method of manufacturing such a pressure-sensitive adhesive tape comprises compounding fillers, including antimony trioxide, with either a part only, or all of the elastomer ingredient of the adhesive, lightly masticating any remainder of the elastomer and dissolving the previously mentioned compounded part of the elastomer together with any lightly masticated part of the elastomer in a solvent, dispersing a polyvinyl chloride paste-making polymer in a liquid resin or resin mixture, adding this dispersion and another resin ingredient or ingredients of the adhesive to the elastomer solution already prepared, and spreading this mixture, after further dilution with solvent if necessary, on to a relatively non-inflammable backing. The amounts of polyvinyl chloride paste-making polymer and antimony trioxide used are sufficient to render the adhesive relatively non-inflammable.

The polyvinyl chloride or copolymer added to the adhesive acts in a known manner as a source of chlorine which, in conjunction with the antimony trioxide, acts as a flame retardant. An advantage of using vinyl chloride polymers and copolymers for this purpose is that they act as inert fillers, thus having little influence on the properties of the adhesive; such small reductions in tack and adhesiveness as do result from their incorporation being to a large extent readily compensated for by relatively small increases in the amounts of the resinous ingredients of the adhesive. Also, vinyl chloride polymers and copolymers are easy to incorporate into the adhesive by the method in accordance with the invention, and their use in the manner described leads to stable spreading mixes. A further advantage is that they are compatible with most backing materials.

We prefer to use in the adhesive as the minimum amounts of antimony trioxide and polymers and/or copolymers of vinyl chloride an amount of antimony trioxide such that it forms at least 7% by weight of the adhesive and an amount of the polymer and/or copolymers of vinyl chloride such that the chlorine content forms at least 3.5% by weight of the adhesive, the weight of the adhesive in each case being taken as the weight of its non-evaporating components. The amounts actually used will vary with the degree of flame resistance required but will in general be kept to the minimum necessary for this purpose, since excessive amounts may unduly affect the adhesive and other properties of the tape.

We prefer to use a backing material based on a plasticised or unplasticised vinyl chloride polymer or copolymer, containing an amount of antimony trioxide equal to at least 2% of the total weight of the vinyl chloride polymer or copolymer including plasticiser if present.

The elastomeric ingredient of the adhesive may be any of the relatively inflammable elastomers known for this purpose, for example natural rubber, styrene-butadiene rubber, butyl rubber, polyisobutylene rubber and mixtures of these.

The invention will be further illustrated by a description by way of example of the composition of an adhesive for use in accordance with the invention, and the method of preparing the adhesive and using it in the manufacture of the tape in accordance with the invention.

The accompanying drawing is a perspective view of the adhesive tape showing a backing 1 carrying a layer of adhesive 2.

The composition of the adhesive in parts by weight is as follows:

| | |
|---|---|
| Smoked sheets (or other form of natural rubber) | 100 |
| Antimony trioxide (rubber-compounding grade) | 50 |
| Zinc oxide | 8 |
| Lanolin | 4 |
| Polyvinyl chloride (paste-making polymer) | 42.5 |
| BX Terpene resin No. 10 | 30 |
| BX Terpene resin No. 115 | 85 |
| Butylene polymer of average molecular weight approximately 1200 | 30 |
| Antioxidant | 3 |
| Petroleum solvent | 420 |

*Notes on ingredients*

(1) The term "Paste-Making Polymer" refers to the type of polymer sold as being suitable for the preparation of the so-called organosols and/or plastisols, a specific example being that sold by Imperial Chemical Industries Limited as "Corvic P. 65/50."

(2) Examples of suitable butylene polymers are (i) that sold as "Polybutene No. 32" and (ii) that sold as "Indopol H 300" by the American Oil Co.

(3) Both of the "BX Terpene Resins" listed are believed to be Beta-Pinene polymers, the No. 10 being a viscous liquid with a Ball and Ring melting point of 10° C. and the No. 115 having a Ball and Ring melting point of 115° C. The latter can be replaced by "Piccolyte S115" which has the same melting point.

A suitable petroleum solvent is that sold by Shell Mex and B.P. Limited as S.B.P.–5 and conforming to the following specification:

Specific gravity 15.5°/15.5° C. _____ 0.710–0.730
Nominal boiling range _____ 95°–105° C.
Initial boiling point _____ 88°–95° C.
Final boiling point _____ 105° C.

Its typical composition by weight is believed to be

Percent
Aromatics _____ 4.5
Naphthenes _____ 44.5
Paraffins _____ 50.5
Unsaturateds _____ 0.5

The method of making the adhesive mass is as follows:

Compound the zinc oxide, antimony trioxide and antioxidant into a portion of the smoked sheet on conventional rubber compounding machinery, adding part of the lanolin if desired. Lightly mill the remainder of the smoked sheet and dissolve together with the previously mentioned portion in a portion of the solvent. Disperse the polyvinyl chloride paste-making polymer into all of the two liquid resins, i.e. BX Terpene Resin No. 10 and Polybutene No. 32, in the manner usually employed when making polyvinyl chloride spreading pastes. Dissolve the BX Terpene Resin No. 115 in a portion of the solvent. When the rubber solution is smooth stir in the lanolin (or the remainder of the lanolin) then the polyvinyl chloride paste, and then the solution of Terpene Resin No. 115. Finally thin to spreading consistency with more petroleum solvent.

The adhesive mass is spread on to a backing material by a normal method, for example a layer of 1 mil to 3½ mils is spread on sheets of plasticised polyvinyl chloride, previously anchor-coated, of thickness 3 mils to 17 mils, the thicker sheets normally carrying the thicker layer of adhesive.

The composition of the backing material in parts by weight is as follows:

Polyvinyl chloride _____ 100
Tritolyl phosphate _____ 50
Basic lead carbonate _____ 6
Calender lubricant _____ 0.5
With or without antimony trioxide ____ 5

The following test results on four varieties of adhesive tape, two in accordance with the invention and two not in accordance with the invention, indicate the improvement obtained by the invention. In these tests two types of backing material were used, of the two alternative compositions specifically referred to above, Composition "X" containing antimony trioxide and Composition "A" not containing antimony trioxide. Also two different adhesive compositions were used, the composition set out by way of example in detail above, hereinafter referred to as "Y," and a typical, relatively inflammable adhesive of the following composition in parts by weight, hereinafter referred to as "B." (2)–(4) of the above "Notes on Ingredients" apply.

Smoked sheets (or other form of natural rubber) __ 100
Zinc oxide _____ 32
Lanolin _____ 13
BX Terpene resin No. 115 _____ 95
BX Terpene resin No. 10 _____ 9.5
Butylene polymer of average molecular weight approximately 1200 _____ 28
Petroleum solvent _____ 465

The four varieties of tape were as follows:
(1) Backing A, adhesive B
(2) Backing X, adhesive B
(3) Backing A, adhesive Y
(4) Backing X, adhesive Y In all cases the approximate thickness of the backing was .006" and the approximate thickness of the adhesive layer after evaporation of the solvent was .002".

Samples from a number of coils of each variety of tape were flame tested, five 1 ft. lengths from each coil being tested. The results obtained were as follows:

| Variety | 1 | 2 | 3 | 4 |
|---|---|---|---|---|
| No. of secs. to extinction: | | | | |
| Coil 1 | (¹) | 9.3 | 6.6 | 6.7 |
| Coil 2 | | 11.1 | 8.4 | 6.0 |
| Coil 3 | | 13.5 | 8.2 | 6.5 |
| Coil 4 | | 11.2 | 9.7 | 5.8 |
| Coil 5 | | 13.5 | 8.0 | ------ |
| Coil 6 | | 10.1 | 6.3 | ------ |
| Coil 7 | | ------ | 7.2 | ------ |
| Average No. of secs. to extinction | (²) | 11.4 | 7.8 | 6.2 |
| Corrected extinction time in secs | 13 | 7.4 | 3.8 | 2.2 |
| Composition | AB | XB | AY | XY |

¹ Very variable.
² About 17.

The figures given above for the number of seconds to extinction are each the average of the five 1 ft. samples from each coil. The test on each sample was carried out as follows:

The sample was suspended vertically by sticking one end to a metal bar placed with its ends resting on top of a metal screen in the form of a metal box, open at the top and at the bottom, 30" high, 12" wide and 12" deep with a window 15" x 6" cut centrally in one face for observation purposes and with the lower edges of each side of the box cut away to a height of 1", except for legs left at each corner, to provide air inlets when the box stands on a solid surface.

A fuse was attached to the lower end of each sample to enable it to be ignited. This fuse consisted of a 1" length of ½" wide cellophane self-adhesive tape of the variety sold as "Sellotape," folded in half with the adhesive surfaces in contact to form a half inch square with each half overlapping the end of the sample by a distance of ⅛" and adhering to it.

The test was carried out by igniting the fuse by means of a match or a very small Bunsen flame, removing the flame immediately the fuse ignites and taking the time in seconds from the first ignition of the fuse until the complete extinction of the flame, whether or not ignited material fell from the tape. The corrected extinction times in the table above are derived from the average extinction times by subtracting 4 secs., the figure of 4 secs. representing an estimate of the burning time for the fuse alone.

It will be seen that the corrected extinction time for variety 3 (AY) is less than ⅓ of that of variety 1 (AB) and variety 4 (XY) is less than ⅓ of that for variety 2 (XB).

The term "paste making polymer" as used in the appended claims means polymer of the kind manufactured and sold for the preparation of vinyl chloride polymer plastisols and organosols.

What we claim as our invention is:
1. A pressure-sensitive adhesive tape comprising a relatively non-inflammable backing carrying a relatively non-inflammable pressure-sensitive adhesive having dispersed therein (a) antimony trioxide, and (b) a finely divided solid vinyl polymeric material containing at least 30% by weight of chlorine selected from the group consisting of homopolymers, copolymers and mixtures thereof, of vinyl chloride.

2. A pressure-sensitive tape as claimed in claim 1 in which the amounts of antimony trioxide and finely divided vinyl polymeric material in the adhesive are such that the antimony trioxide forms at least 7% by weight of the non-volatile components of the adhesive and the total chlorine content of the finely divided vinyl polymeric material forms at least 3.5% by weight of the non-volatile components of the adhesive.

3. A pressure-sensitive adhesive tape as claimed in claim 1 in which the vinyl polymeric material is in the finely divided form known as paste-making polymer.

4. A pressure-sensitive adhesive tape as claimed in claim 1 in which the relatively non-inflammable backing is of a material based on a vinyl polymer selected from the group consisting of polyvinyl chloride, plasticised polyvinyl chloride, copolymers of vinyl chloride and plasticised copolymers of vinyl chloride.

5. A pressure-sensitive adhesive tape as claimed in claim 4 in which the backing material contains antimony trioxide.

6. A pressure-sensitive adhesive tape as claimed in claim 5 in which the backing material contains an amount of antimony trioxide equal to at least 2% of the total weight of the vinyl polymer in the backing material, including plasticiser if present.

References Cited by the Examiner

UNITED STATES PATENTS

| 2,416,447 | 2/47 | Laughlin et al. | 106—15 |
| 2,436,216 | 2/48 | Leatherman | 106—15 |
| 2,554,791 | 5/51 | Nickerson | 117—76 |
| 2,979,423 | 4/61 | Weinberg | 117—122 |
| 3,034,939 | 5/62 | Newkirk | 106—15 |
| 3,089,786 | 5/63 | Natchtsheim et al. | |
| 3,121,067 | 2/64 | Nelson | 252—8.1 |

FOREIGN PATENTS 231,029  10/58  Australia.

WILLIAM D. MARTIN, *Primary Examiner.*